July 19, 1927.

G. E. KERNES 1,636,136

DITCH MAINTAINER

Filed Jan. 2, 1926     4 Sheets-Sheet 1

Inventor
G.E.Kernes.

By Arthur H. Sturges
Attorney

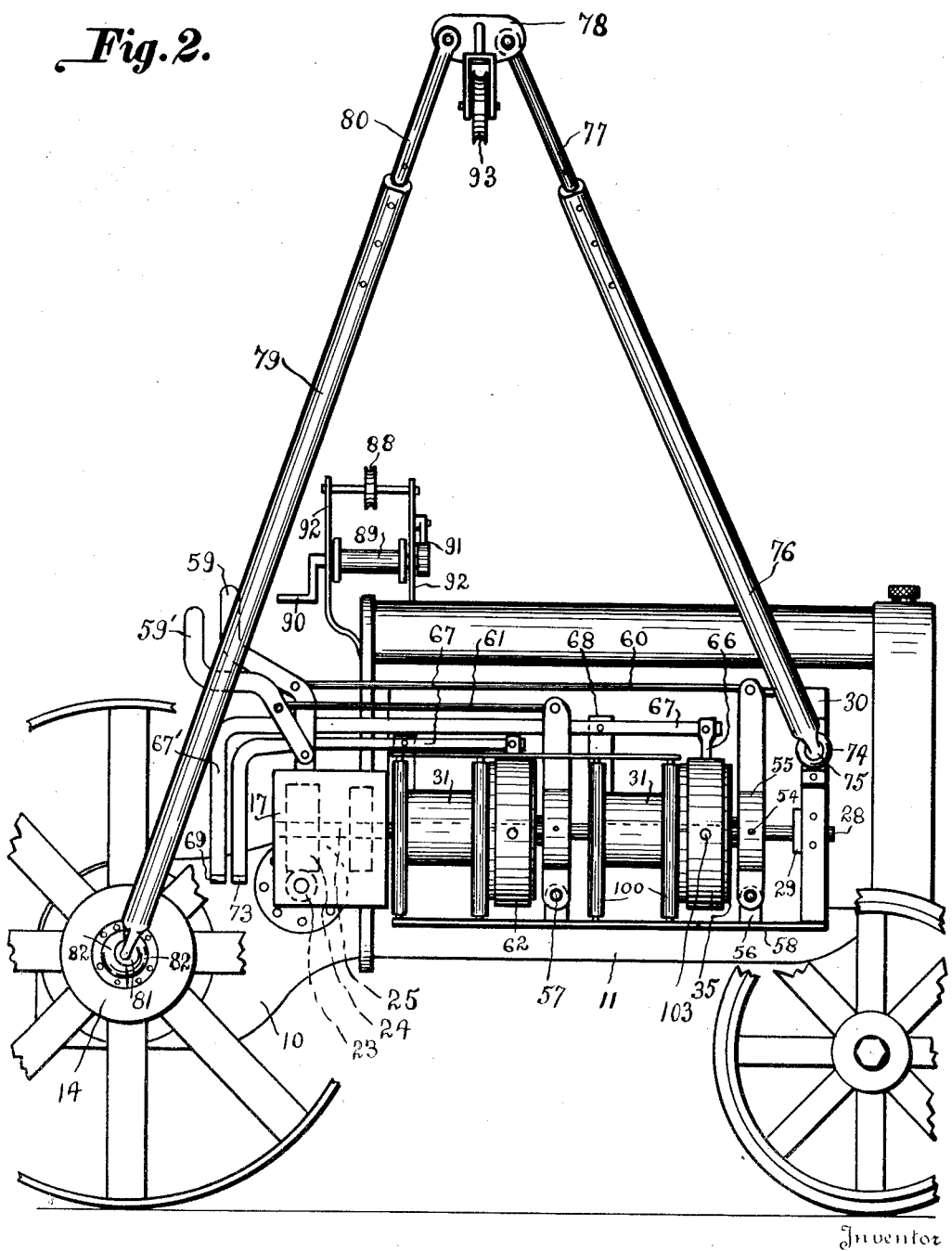

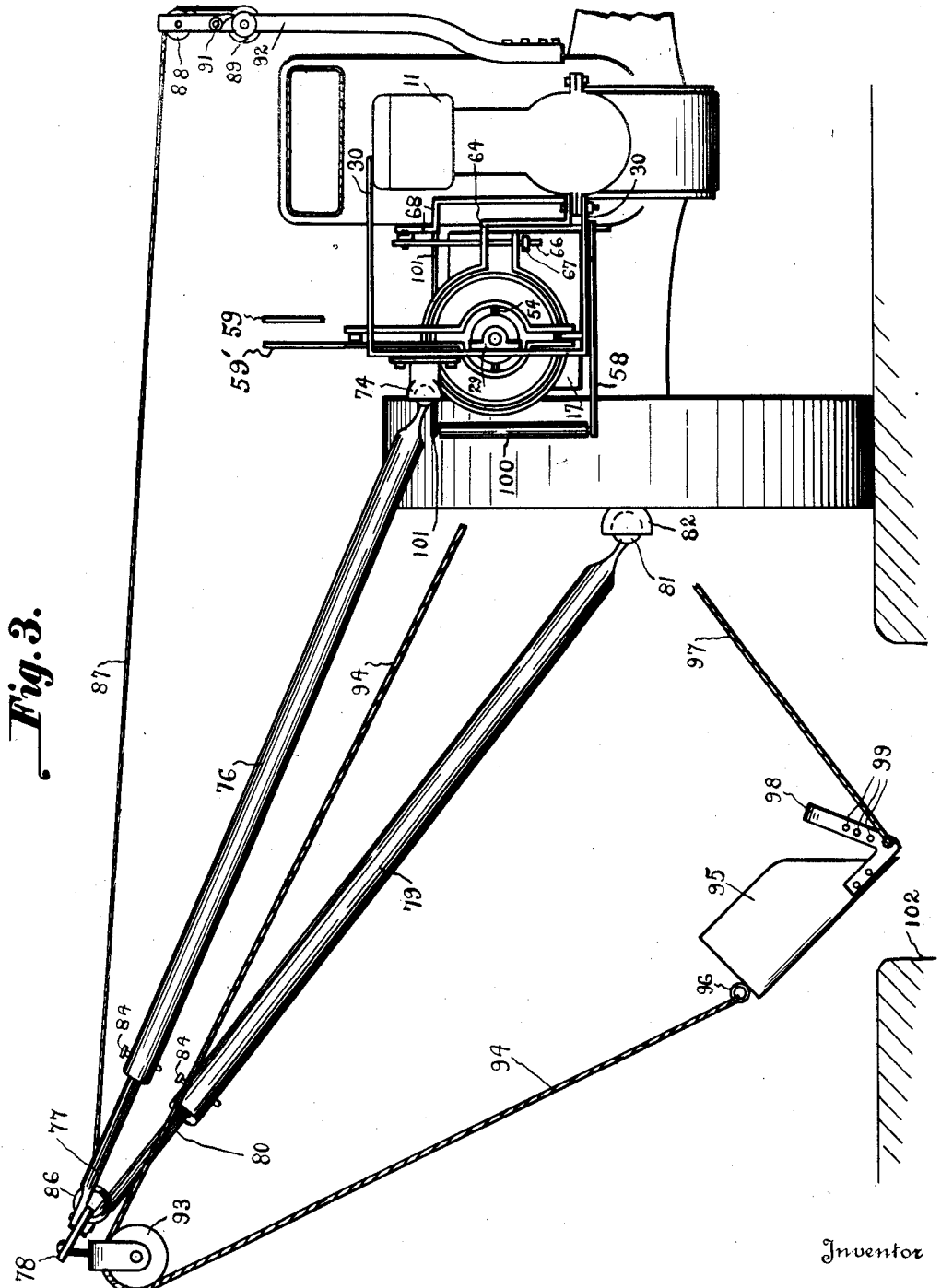

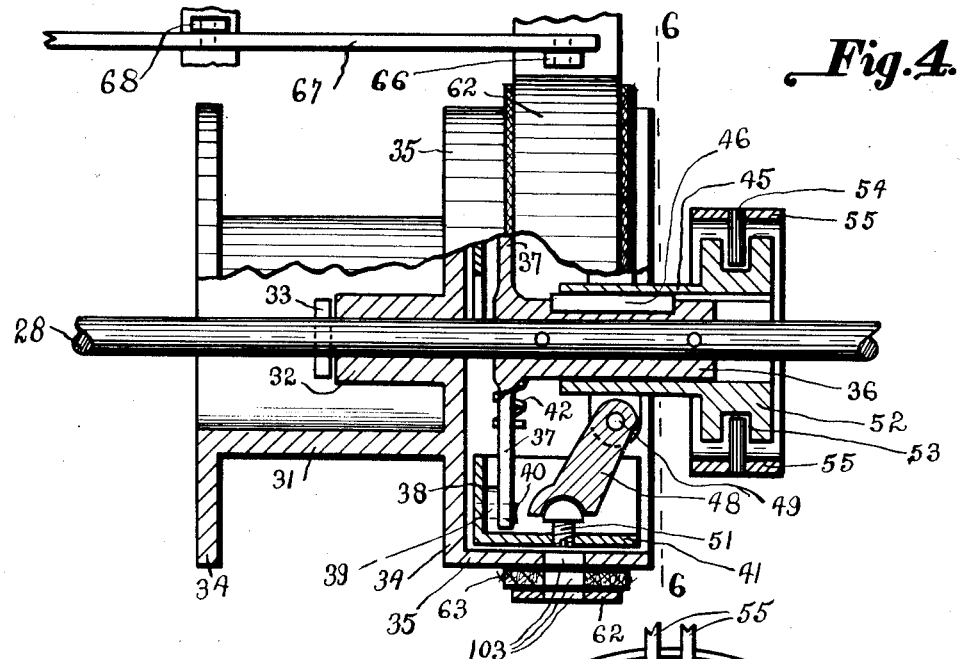
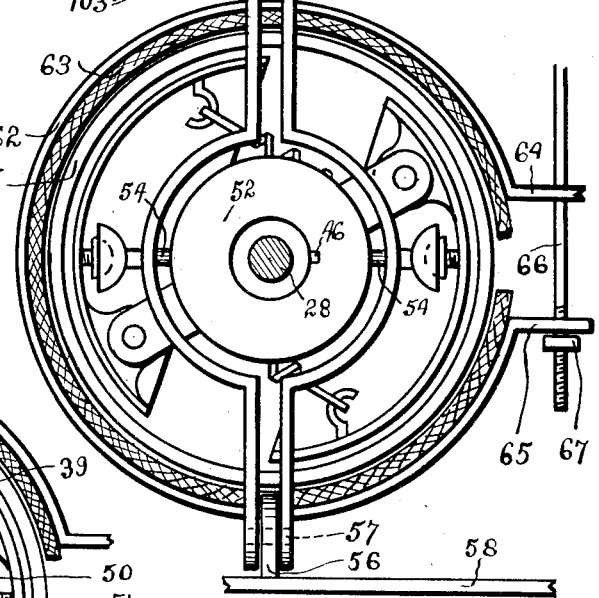
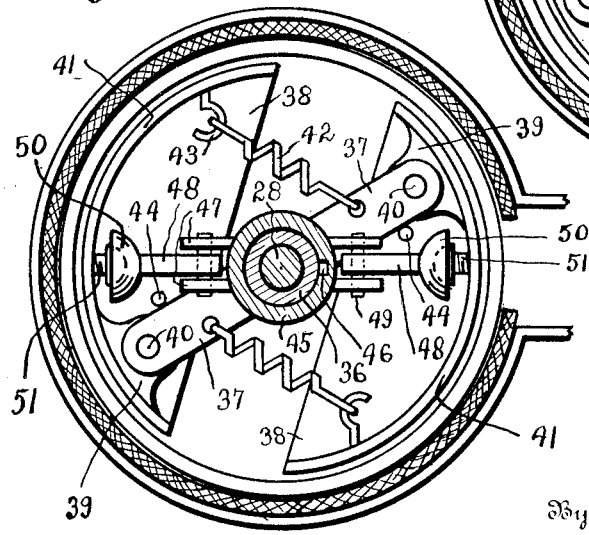

Patented July 19, 1927.

1,636,136

UNITED STATES PATENT OFFICE.

GEORGE E. KERNES, OF OMAHA, NEBRASKA.

DITCH MAINTAINER.

Application filed January 2, 1926. Serial No. 78,842.

The present invention relates to ditch maintainers, and has for an object to provide an apparatus of this character which may be readily attached to and removed from, and which may be operated in combination with, a tractor of conventional type.

Another object of this invention is to provide a rapidly acting mechanism, the gearing of which may be placed in a confined space at one side of the tractor between the wheel and body thereof.

The invention has for a further object to provide controls for the mechanism which are operable from the driver's seat; so that one man may control both the tractor itself and also the maintainer mechanism without shifting his position.

A further object of the invention is to provide a highly mobile combination, which will function both as a tractor and maintainer without detachment of one unit from the other and wherein the ditch maintainer mechanism will not interfere with the usual operation of the tractor for other purposes of which the tractor is adapted.

Another object is to provide a new type of clutch for the winding mechanism which is peculiarly constructed for the present special adaptation.

A further aim of the invention is to provide a novel type of outrigger boom and a quickly detachable or revolvable swivel mounting therefor adapted to be carried on the tractor.

The invention also aims, as one of the principal objects, to provide means for producing the proper gear ratio between the propeller shaft of the tractor and the winding drums; and to so mount and construct the gearing that it will function properly and may be disposed in confined space, such as between a rear wheel and one side of the transmission case of the tractor.

The invention still further aims to provide a novel mounting for an outrigger boom upon the revolvable rear wheel of the tractor; thereby conserving room and having the particular advantage of providing a mounting for one leg of the boom which is at a low point close to the ground.

The invention also provides a novel arrangement of gearing to admit, in the relatively small space provided, spools or drums of sufficient diameter to prevent cracking or injuring of steel cables so that the latter may be used, and so that the proper gear ratio may be had.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a conventional type of tractor having a device constructed according to this invention applied thereto, parts being broken away and other parts being shown in section.

Figure 2 is a side elevation of the same but with the digger bucket and winding cables removed.

Figure 3 is a fragmentary front elevation of the same, the front of the tractor being in section on the line 3—3 of Figure 1, and looking in the direction of the arrows.

Figure 4 is a detail enlarged longitudinal section of the combined winding spool and clutch with a brake mechanism and its operating means for the spool.

Figure 5 is an end view of the same, and

Figure 6 is a transverse section taken on the line 6—6 of Figure 4, showing the clutch operating mechanism.

Figure 1:
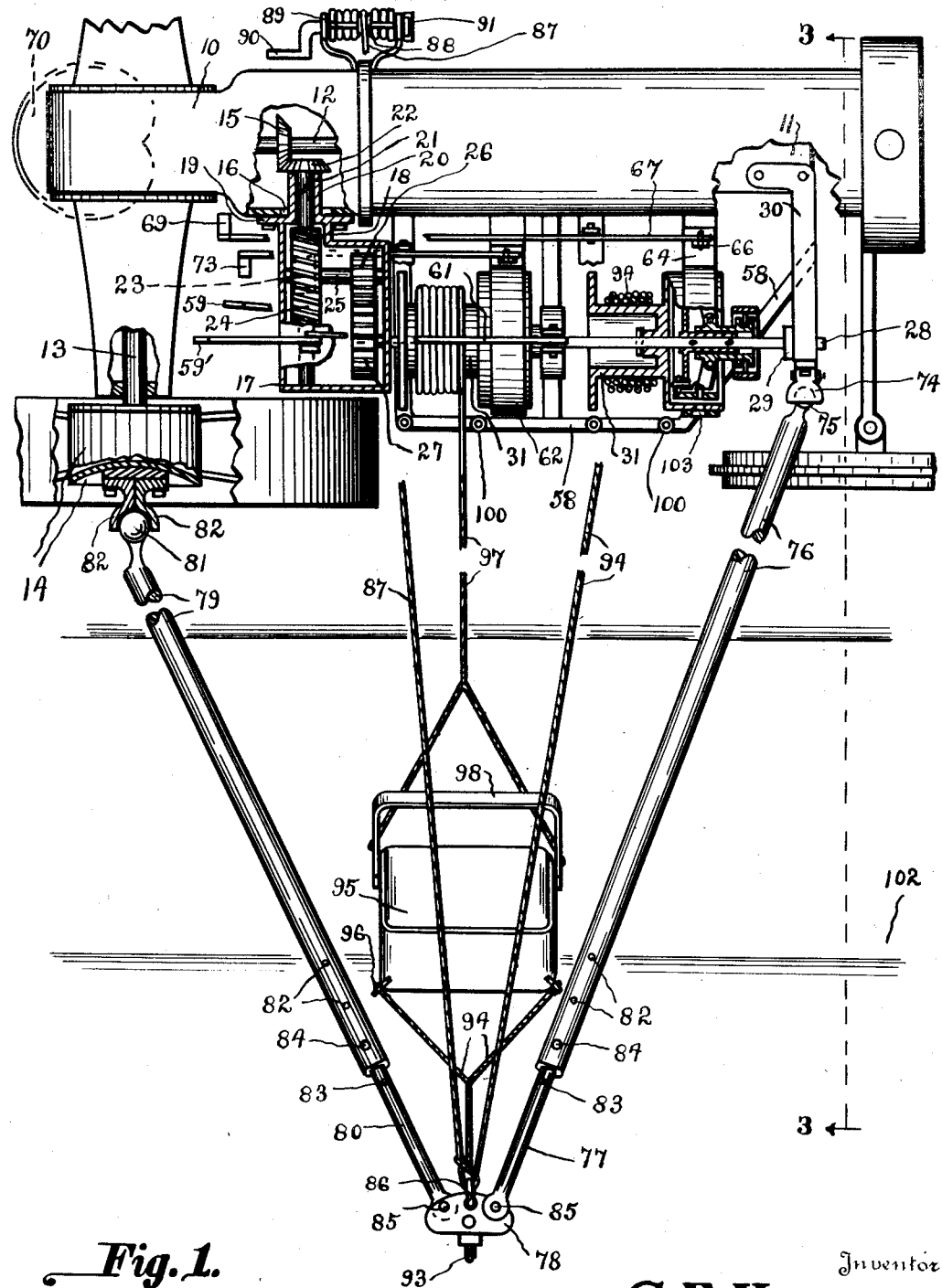

Referring now to the drawings for a more particular description, wherein like numerals refer to corresponding parts throughout the several views of the drawings, the numeral 10 designates a tractor, having an engine 11, a propeller shaft 12, a rear axle 13, a rear wheel-spoke receiving drum 14, and a toothed gear wheel 15 keyed to said propeller shaft 12; all of which are of conventional form and common to a tractor of the Fordson type.

An opening 16 is provided through the side of the transmission case of the Fordson tractor, said opening being in alinement with the gear wheel 15 and normally provided with a cover, which in the practice of the present invention is removed. The gearing for the winding drums is housed within the case 17 of rectangular and box-like shape, and provided with a neck portion 18 and a flanged collar 19. The collar 19 is apertured for receiving bolts or the like which are secured to the side of the tractor 10 in the usual bolt holes provided about the aperture 16. In this manner a rigid mounting is provided for the gear case 17.

A sleeve 20, carried by the flange 19, has journaled within it a shaft 21 driven by a gear wheel 22 which is in mesh with the gear wheel 15, the gear wheels 15 and 22 being arranged at right angles to each other and of the bevel type. The other end of the shaft 21 is journaled in the outer side wall of the casing 17 and has at an intermediate portion a worm 23, clearly shown in Figure 2.

The worm 23 is in mesh at all times with a toothed gear wheel 24 mounted on a shaft 25. By this means the propeller shaft 12 drives the shaft 25, and the speed ratio may be reduced substantially, such as to ten to one. A drive gear 26 is mounted upon the shaft 25 and is in mesh with a driven gear 27 which in turn drives the line shaft 28 upon which it is mounted.

It will be understood that the space between the side of the tractor 10 and the inner edge of the rear wheel is comparatively limited and narrow, and it has been found that the present exact arrangement of gearing within the casing 17 is very practical and is preferred for transmitting the power to the line shaft 28, and that the shaft 25 and gear wheels 26 and 27 are necessary in order to reduce the ratio and have the line shaft far enough away from the side of the tractor to accommodate the comparatively large diameter of the cable spools as later described.

The line shaft 28 is journaled in the casing 17 at one end and supports the gear wheel 27, its forward end being journaled in a pillow block 29 supported by a bracket arm 30, which, as best shown in Figure 3, is U-shaped with its open end bolted upon the top and to the crank case of the engine 11.

A pair of cable winding spools 31 are supported by the line shaft 28 upon which they are loosely mounted for rotary motion and may at times be driven by the line shaft 28 when locked to it by means of a novel clutch mechanism. The spools 31 and their clutch mechanisms are similar one to another, and the detail structure is more clearly shown in Figures 4, 5 and 6.

The spool 31 is provided with a hub 32 for support and free rotation upon the shaft 28, the shaft 28 having a pin 33 or similar detent for preventing sliding movement of the spool. The spool 31 has spaced flanges 34 providing retaining walls for the flexible cable later described. The forward flange 34 is integral with a drum portion 35 which at selected times may be locked with a clutch mechanism for driving the spool, or a brake mechanism for stopping rotation of the spool, as later described.

The clutch mechanism consists of a hub 36 which is pinned to the shaft 28, or otherwise locked thereto for rotation with the shaft 28 at all times. The hub 36 is provided with two arms 37 each of which carries a clutch shoe 38.

As shown in Figures 4 and 6, the shoes 38 are segmental in form and L-shape in cross section, their vertical walls carrying bushings 39, pivoted to the arms 37 by means of pins 40. The peripheral portions 41 of the shoes 38 engage the inner side wall of the drum 35 and may have brake lining if desired. The shoes 38 are normally held from contact with the drum 35 by springs 42 which are fastened to the arms 37 and hooks 43, said hooks secured to the flanges 41 of the shoes. Detents 44 may be employed if desired for limiting the swinging movements of the shoes 38, said detents being secured to the vertical walls 38 of the shoes and adapted to strike against the arms 37. A sliding sleeve 45 is splined on the hub 36 by a key 46. This sleeve 45 is provided with two pairs of ears 47, Figure 6, between which the swinging legs 48 are secured by means of pins 49. The legs 48 are provided with cupped shaped feet 50 which rest upon the rounded heads of threaded pins 51 at all times, said pins 51 seated in the flanges 41 of the shoes. The ends of pins 51 are provided with kerfs or slots for receiving the bit of a screw driver for adjusting the pins 51. It will be noted that when the sleeve 45 is moved toward the spool 31 the feet 50 are pressed outwardly, and the shoes are thus forced into engagement with the drum 35 to lock the spool 31 for rotation with the shaft 28. The sleeve 45 is provided with a hub 52 having a peripheral slot 53 within which pins 54 are received. The hub 52 rotates at all times with the shaft 28 but the pins 54 do not rotate but are supported by the lever 55.

The lever 55 is preferably formed of two members each having semi-circular portions spaced about the hub 52 and support the pins 54. The lower end of the lever 55 is attached to a standard 56 by means of a pin 57 and having vertical swinging movements. The standard 56 is supported by an arm 58, Figures 1 and 2, supported by the bracket arm 30.

The lever 55 is adapted to be moved by the operator at desired times by means of a hand lever 59 which communicates motion through a connection rod 60. The lower end of the hand lever 59 is pivoted to and supported by the top of the gear case 17. A similar hand lever 59' is also mounted on the gear case 17 and is adapted to control the rear clutch and its spool 31 through a rod 61; the arrangement of the front and rear spools 31 and their controls being similar.

The braking mechanism for the spools comprises the following:—

As best shown in Figure 5 an annular brake band 62 substantially circumscribes the drum 35 of the spool 31. Brake lining 63 may be used if desired between the band 62 and the drum 35. If used the lining 63 may be secured to the band 62 by rivets. The band 62 is supported at one of its open ends 64 from and by the engine as shown in Figure 3, bolts being used for the connection. The other or lower end 65 being provided with a pull rod 66 which extends vertically through both members 64 and 65.

The lower end of the rod 66 is threaded for receiving an adjusting nut 67 adapted to engage against the end 65 for drawing the lower free end 65 toward the stationary fixed end 64 of the band 62. It will be understood that the band 62 is formed of resilient spring steel, and since the end 64 is held rigid, the normal tendency of the band 62 is to spring outwardly away from the member 35 at all times, except when contracted by means of the rod 66 in a manner to cause the band 62 to contact with the drum 35 for stopping the rotation of the spool 31. As best shown in Figure 2, the upper ends of the rods 66 are pivotally connected to levers 67 which are pivoted to supports 68, said supports being bolted to and supported by the engine 10 as best shown in Figure 3.

The levers 67 extends rearwardly over the casing 17, and above it a sufficient distance in order that the rear ends of the levers 67 may move downwardly to contract the bands 62 and will not touch the top of said gear casing 17. Each lever 67 has a downwardly extending portion 67' which is provided with a foot rest 69 which is much lower than the operator's seat 70 as shown in dotted lines in Figure 1. An outrigger boom is employed for supporting and operating various tools for several purposes. The boom is constructed primarily of two extensible legs, each leg being formed of telescoping pipe members which are removably supported by the tractor and pivoted thereto for vertical swinging movements by means of ball and socket joints.

The forward socket joint 74 is bolted to the bracket arm 30 and receives the ball 75 which is fastened to the hollow pipe leg 76, said member 76 receives the extension 77, which is pivotally attached to a plate 78 upon its upper side.

The rear leg 79 is similarly provided with an extensible portion 80 which is pivoted to the plate 78, said leg 79 being provided with a ball 81 which is received within a split socket member 82 formed of two half portions which are bolted to the drum or hub 14 of the rear wheel. It will be understood that the socket 82 revolves with the rear wheel while supporting the ball 81 which will remain stationary except for vertical swinging movements. The forward socket 74 remains stationary at all times. The novel construction of ball and socket and its mounting upon the rear wheel has been found of great advantage, since the leg 79 is thus adequately supported in a removable manner from this convenient point near the ground. The legs 76 and 79 are provided with selected apertures 82, the rods 77 and 80 being likewise equipped with apertures 83. By this means the legs may be extended to a comparatively great distance and the bolts 84 placed through selected apertures for retaining the rods 77 and 80 rigid. The legs may be detached from their supports and folded together for transportation the pivot pins 85 permitting this operation. The horizontal level of the end of the boom may be adjusted as follows:—

The plate 78 is provided with a ring 86 for a cable 87 which extends over a pulley 88 to a winding drum 89 which as best shown in Figure 2 is provided with a crank handle 90 and a ratchet and pawl detent 91. The foregoing parts are supported by upright standards 92 which, as best shown in Figure 3, are bolted to the tractor 10 at the opposite side from the balance of the mechanism, and which may or may not be braced as found expedient. By turning the crank 90 and ratchet 91 the boom may be raised and lowered.

The plate 78 pivotally supports a pulley 93 over which is trained a cable 94, said cable, as shown in Figure 1, being branched at its lower end and attached thereat to a digger bucket 95 by any suitable means such as the rings 96. The other end of the cable 94 extends to the forward spool 31, passing beneath the same and wound thereon in a suitable number of turns. The rear spool 31 is similarly provided with a cable 97 having branched ends attached to a brace 98 on the bucket 95, the ends of the cable 97 being selectively engaged in openings 99 in the brace 98.

Vertical anti-friction rollers 100 are used for guiding the cables over the spools. As shown in Figure 3, the rollers 100 are supported for rotary motion between the arm 58 and a bracket 101 bolted to the engine 11 in any suitable manner. It will be understood that the tractor is equipped with the conventional controls for traveling over the ground which are actuated by the operator positioned in his seat 70. In some classes of work in which the combination is adapted for use, the machine is moved forward intermittently, for short distances, and it is advantageous for the operator to drive the tractor as well as digger mechanism without changing the position of his body. The operator is required only to shift his feet from the tractor controls to the pedals 69 and 73 of the digger mechanism and shift his hands to the levers 59 and 59' from the steering wheel and other usual controls. This is of great importance as one man may thus operate both devices.

In operation, one of the legs 76 or 79 may be extended and made longer than the other to locate the plate 78 forward or rearward of the intermediate position shown in Figure 1. This is of great advantage in some classes of work. When so positioned the rollers 100 are used for guiding the cables over the spools 31.

In irrigation ditch cleaning a digger bucket is employed, such as shown in Figure 3. By attaching the cable 97 through selected holes 99 the depth of the "cut" may be adjusted. If the cable 97 is attached to the upper holes of the bucket, the cut will be deeper than when the cable 97 is attached in the lower opening 99 as shown in Figure 3. To clean a ditch the engine 11 of the tractor 10 is permitted to run free and the operator pulls the hand lever 59 toward himself to cause the forward spool clutch to engage, and since the line shaft 28 is driven by the engine, the spool 31 will be caused to rotate and wind up cable 94. This operation draws the bucket 95 outwardly and across the ditch 102. Then the operator releases the lever 59 and applies the brake by means of his foot upon the rest 69 to stop the travel of the bucket at the desired position. The hand lever 59' is now moved to cause the clutch and rear spool 31 to operate and draw the bucket 95 toward the machine to load it. The cables 94 and 97 subsequently being operated to tilt the bucket and dump the load of earth.

The machine may also be used for filling trenches, and in such work a flat scraper is preferably substituted for the bucket 95.

As shown in Figure 4, the threaded bolt 51 may be provided with a screw driver slot or kerf for admitting adjustment of the slack or wear of the clutch shoes 38, as follows:— An aperture 103 is provided through the member 35, the brake lining 63 and the brake band 62 for the reception of a screw driver or the like to turn the bolt 51 to vary its effective length. The spool 31 may be turned over a half turn until the opposite bolt 51 registers with the aperture 103 for adjusting the opposite bolt 51 in a similar manner.

I do not wish to be restricted to the size, form and proportions of the various parts and obviously changes could be made in the construction herein described without departing from the spirit of the invention, it being only necessary that such changes fall within the scope of the appended claims.

What is claimed is:—

1. A ditch maintaining attachment for tractors comprising a relatively long narrow lateral frame, means for securing the frame against one side of the tractor inwardly of the adjacent side wheels thereof, hoisting means mounted on the frame and including cables, a boom for the tractor including a pair of arms, a universal socket for one arm and mounted on the hub of the rear wheel of the tractor, and a second universal socket mounted on the forward end of said lateral frame for supporting the other arm of the boom.

2. A ditch maintaining attachment for a tractor having a propeller shaft and a beveled drive pinion on the propeller shaft, a relatively long and narrow side frame, means for mounting said frame at the side of the tractor inwardly of the adjacent side wheels, hoisting means mounted on the side frame and including cables, transmission means arranged at said side of the tractor between the body thereof and the adjacent rear wheel and connected to said hoisting means and provided with a pinion adapted to engage said drive pinion of the propeller shaft for operating the hoisting means in the side frame, and a boom pivotally mounted upon the side of the tractor for supporting and guiding said cables.

In testimony whereof I have affixed my signature.

GEORGE E. KERNES.